(12) United States Patent
Float et al.

(10) Patent No.: US 6,685,104 B1
(45) Date of Patent: Feb. 3, 2004

(54) LANDSCAPE SPRINKLING SYSTEMS

(76) Inventors: Ardele Y. Float, 2 Shire, Coto de Caza, CA (US) 92679; Kenneth W. Float, 2 Shire, Coto de Caza, CA (US) 92679

( * ) Notice: Subject to any disclaimer, the term of this patent is extended or adjusted under 35 U.S.C. 154(b) by 0 days.

(21) Appl. No.: 10/197,083

(22) Filed: Jul. 17, 2002

(51) Int. Cl.⁷ ............................................. B05B 17/04
(52) U.S. Cl. ..................... 239/63; 239/69; 239/201; 239/207; 239/550; 239/551; 169/16; 169/60
(58) Field of Search ........................... 239/63, 69, 68, 239/200–201, 203, 207, 550–551, 562, 565, DIG. 15; 169/5, 16, 54, 6, 60

(56) References Cited

U.S. PATENT DOCUMENTS

| | | | | |
|---|---|---|---|---|
| 4,265,403 A | * | 5/1981 | Bonetti ........................ 239/66 |
| 4,330,040 A | * | 5/1982 | Ence et al. .................... 169/13 |
| 4,852,802 A | | 8/1989 | Iggulden et al. ............... 239/64 |
| 5,021,939 A | * | 6/1991 | Pulgiese ....................... 700/14 |
| 5,059,064 A | * | 10/1991 | Justice ........................ 405/37 |
| 5,074,468 A | | 12/1991 | Yamamoto et al. ............ 239/69 |
| 5,165,482 A | * | 11/1992 | Smagac et al. ................ 169/45 |
| 5,173,855 A | | 12/1992 | Nielsen et al. ............... 700/284 |
| 5,251,153 A | | 10/1993 | Nielsen et al. ............... 700/284 |
| 5,263,543 A | * | 11/1993 | Nigro ........................... 169/56 |
| 5,333,785 A | | 8/1994 | Dodds et al. .................. 239/69 |
| 5,337,957 A | * | 8/1994 | Olson ........................... 239/63 |
| 5,445,178 A | | 8/1995 | Feuer ............................ 137/1 |
| 5,486,811 A | * | 1/1996 | Wehrle et al. ............... 340/522 |
| 5,813,606 A | * | 9/1998 | Ziff .............................. 239/67 |
| 5,870,302 A | | 2/1999 | Oliver .......................... 700/11 |
| 5,927,603 A | | 7/1999 | McNabb ....................... 239/63 |
| 5,931,233 A | * | 8/1999 | La Bonte et al. ............... 169/5 |
| 5,936,531 A | * | 8/1999 | Powers ....................... 340/628 |
| 5,982,274 A | * | 11/1999 | Stelter et al. ............. 340/286.05 |
| 6,016,971 A | * | 1/2000 | Welch et al. .................. 239/63 |
| 6,104,301 A | * | 8/2000 | Golden ....................... 340/628 |
| 6,123,093 A | | 9/2000 | D'Antonio et al. .......... 137/78.3 |
| 6,298,285 B1 | | 10/2001 | Addink et al. ............... 700/284 |
| 6,314,340 B1 | * | 11/2001 | Mecham et al. ............. 700/284 |
| 6,377,181 B1 | * | 4/2002 | Kroll et al. .................. 340/604 |

* cited by examiner

*Primary Examiner*—Gregory Huson
*Assistant Examiner*—Amanda Flynn
(74) *Attorney, Agent, or Firm*—Kenneth W. Float

(57) ABSTRACT

Landscape sprinkling systems that incorporate fire sensors, optional moisture sensors, and control electronics that continuously monitor the perimeter of a property for fire and/or smoke, and optionally low soil moisture conditions. When an alarm is detected, the systems automatically turn on selected sprinkler valves to water areas that would be most impacted by a fire or are in need of water. Wireless and wired system embodiments are disclosed.

17 Claims, 4 Drawing Sheets

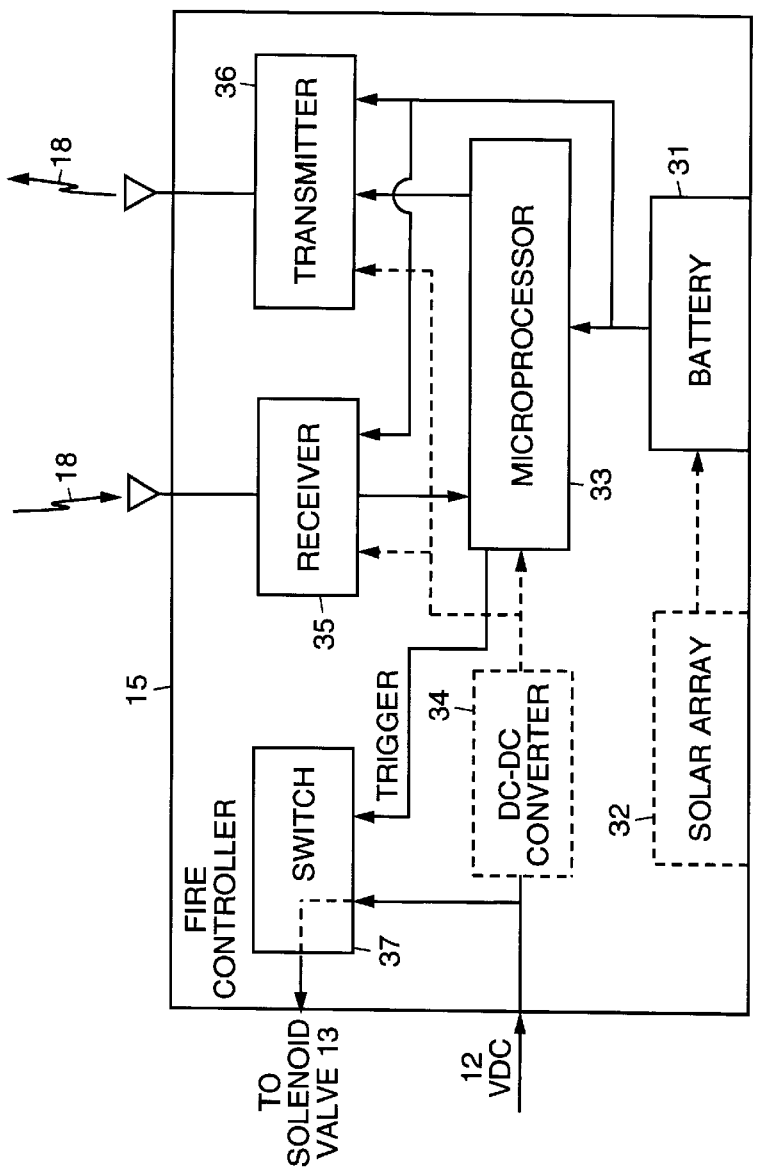

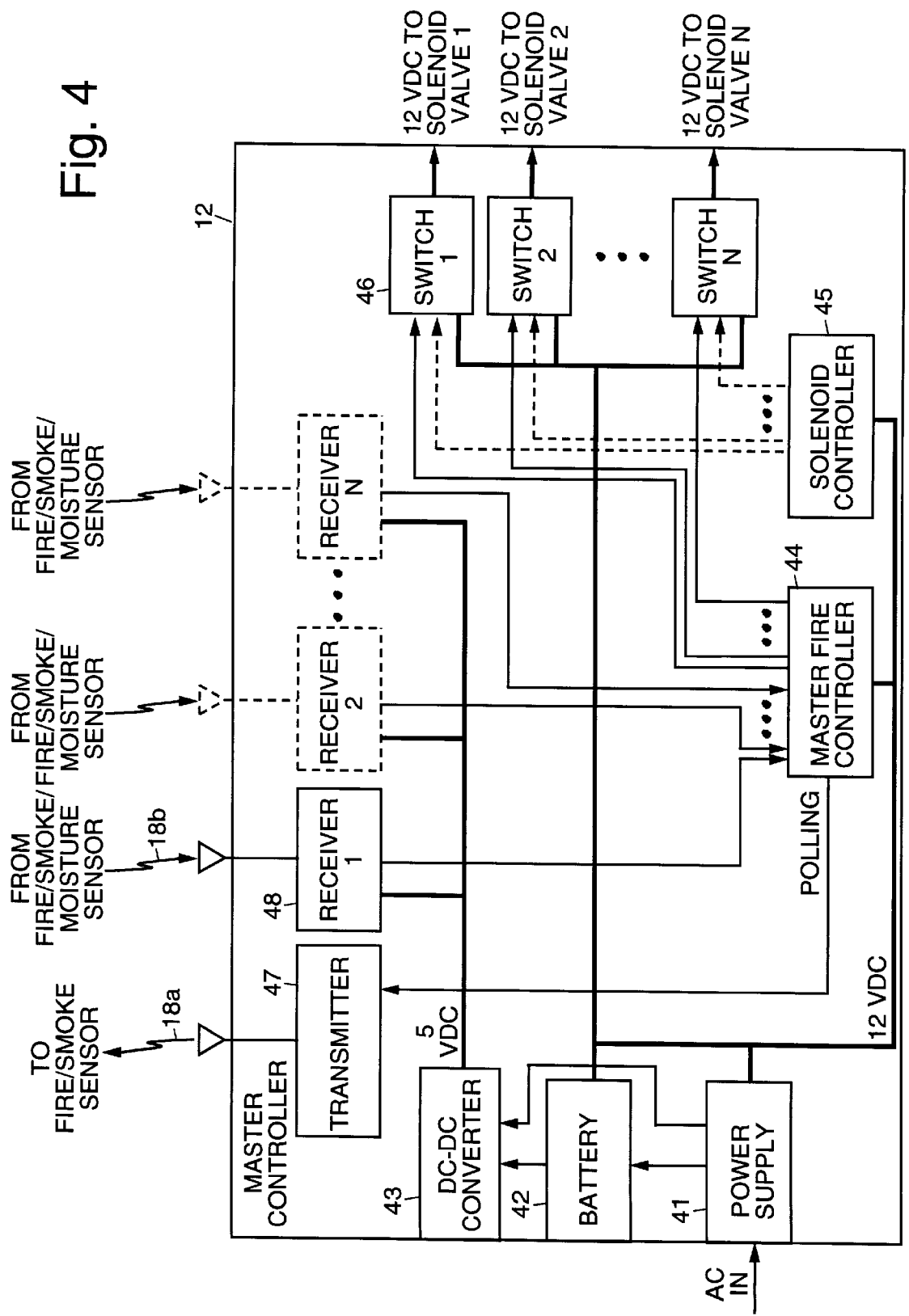

LANDSCAPE SPRINKLING SYSTEMS

BACKGROUND

The present invention relates generally to landscape sprinkling systems, and more particularly, to landscape sprinkling systems that include remote fire and moisture sensing features.

The present inventors live in a California community that is adjacent to a national forest, wildlife parks, and conservancy area. The community also has dedicated conservation areas throughout it that contain native vegetation that is not watered except by rain. Unfortunately, these areas are very prone to fires.

A recent fire that affected this community burned very dry native vegetation that was located about fifty feet away from many dwellings. While no homes were lost, this was a terrifying experience for many, and revealed a real problem regarding planting that is in close proximity to dwellings that are in fire prone areas.

There is a need for a landscape sprinkling system that would automatically turn on selected sprinkler valves to water specific areas to help minimize the impact of fires on a dwelling or other structure. Such a system would be particularly valuable in the event that occupants of the structure were not home, for example.

Also, in the past, moisture sensors have been used that sense the amount of moisture in the ground and inhibit operation of the irrigation system in selected areas that are too wet and do not need additional water. However, such conventional moisture sensors are normally hard-wired in series with the sprinkler solenoid valve.

It is therefore an objective of the present invention to provide for landscape sprinkling systems that have remote fire and moisture sensing features.

SUMMARY OF THE INVENTION

To meet the above and other objectives, the present invention provides for landscape sprinkling systems that incorporate fire and/or smoke sensors and control electronics that continuously monitor the perimeter or other selected areas of a property for fire and/or smoke. Optional moisture sensors employed with the remote fire and/or smoke sensors implement integrated feedback-based systems.

In the event that fire or smoke is detected, the systems automatically turn on selected sprinkler valves to water areas that would be most impacted by a fire. Remote areas of the property or areas adjacent to an affected property may therefore be watered before a fire reaches the property so as to minimize the impact of the fire on the property and structures thereon.

Use of the optional moisture sensors allows for remote sensing of the moisture content of the ground. The optional moisture sensors output signals that allow specific low-moisture area of a landscape to be watered when needed.

An exemplary system comprises one or more remote fire/smoke sensors (that may include an optional moisture sensor) that communicate with a master controller or fire controllers that are attached to sprinkler solenoid valves. The master controller controls the sprinkler solenoid valves in a conventional manner for normal irrigation purposes. In a first embodiment, the master controller controls the sprinkler solenoid valves in response to the detection of fire and/or smoke by the remote fire/smoke sensors in the event of a fire, or in response to signals output by the optional moisture sensors. In a second embodiment, the remote fire/smoke sensors communicate with the fire controllers to activate selected sprinkler solenoid valves in response to the detection of fire and/or smoke, or in response to signals output by the optional moisture sensors.

The remote fire/smoke sensors may communicate with the master controller or fire controllers by way of radio frequency (RF) communication signals, or optionally by way of infrared communication signals if the sensors are located at relatively short distances from the master controller, and line-of-sight communication paths are present. The remote fire/smoke sensors are intended to be on at all times and each of them are separately identified and send a signal to the master controller at regular intervals indicating that they are operative. The remote fire/smoke sensors are preferably powered by a battery, but may be powered by a solar cell and battery combination. Alternatively, the remote fire/smoke sensors may be hard wired to the master controller, which has some desirable benefits, although this is may be a slightly more involved or costly implementation.

In a first embodiment, the master controller includes a transmitter and one or more receivers that are used to poll the remote fire/smoke sensors (and optional moisture sensors). The master controller processes alarm signals transmitted by the remote fire/smoke sensors in the event that fire and/or smoke are detected by one or more of the remote fire/smoke sensors, or processes output signals from the optional moisture sensors indicating low moisture content. Once an alarm signal is received by the master controller, it is processed to turn on one or more solenoid valves that allow water to be sprinkled onto the affected area, or to hold off sprinkling in areas of excessive moisture.

In a second embodiment, the remote fire/smoke sensors (and optional moisture sensors) communicate with fire controllers that are individually attached to respective sprinkler solenoid valves. In the event that fire and/or smoke are detected by a remote fire/smoke sensor, or low moisture is detected, signals are transmitted to one or more fire controllers responsible for the affected area to turn on the solenoid valves to sprinkle water onto the affected area.

As was mentioned above, the present invention may incorporate moisture sensors along with the remote fire/smoke sensors. Remote fire/smoke sensors containing a moisture sensor have the ability to monitor the moisture content of the ground and output signals that are communicated to the master controller or fire controller to activate or inactivate sprinkler usage during normal irrigation operation. The output of the remote fire/smoke sensor would supercede the output of the moisture sensors in the case of a fire.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3 is a block diagram that illustrates an exemplary fire controller that may be employed in the present invention;

FIG. 4 is a block diagram that illustrates an exemplary master controller employed in the present invention; and FIG. 5 is a table that illustrates a typical serial communication protocol that may be used in the present systems

DETAILED DESCRIPTION

Figure 1:
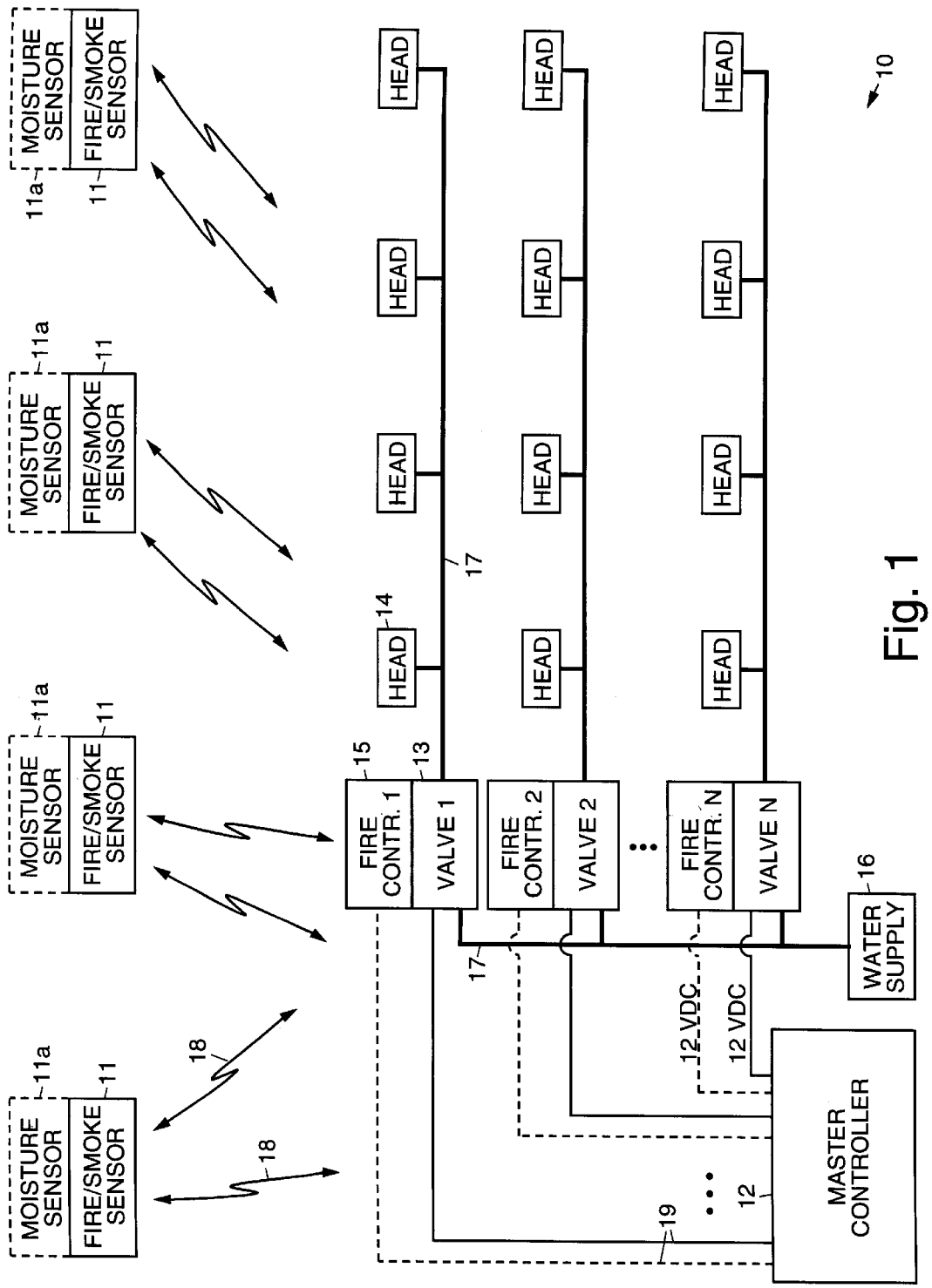
FIG. 1 is a block diagram that illustrates embodiments of exemplary landscape sprinkling systems implemented in accordance with the principles of the present invention.

Referring to the drawing figures, FIG. 1 is a block diagram that illustrates embodiments of exemplary landscape sprinkling systems 10 implemented in accordance with the principles of the present invention. The exemplary systems 10 comprise one or more remote fire/smoke sensors 11 that may each include an optional moisture sensor 11a. The remote fire/smoke sensors 11 (and moisture sensors 11a) communicate with a master controller 12 or with fire controllers 15 that are attached to sprinkler solenoid valves 13.

The sprinkler solenoid valves 13 are coupled to a water supply 16 and to a plurality of sprinkler heads 14 that are part of separate irrigation areas or zones by way of pipes 17, such as plastic (PVC) tubing 17. The master controller 12 is electrically coupled to the sprinkler solenoid valves 13 using low voltage-wiring 19 and controls them in a conventional manner during normal irrigation times, typically using 12 volt DC control signals.

In a first embodiment of the system 10, the master controller 12 controls the sprinkler solenoid valves 13 in response to the detection of fire and/or smoke by the remote fire/smoke sensors 11 in the event of a fire, or in response to signals output by the optional moisture sensors 11a indicating low moisture content of the soil.

In a second embodiment of the system 10, the remote fire/smoke sensors 11 communicate with the fire controllers 15 to activate selected sprinkler solenoid valves 13 in response to the detection of fire and/or smoke, or in response to signals output by the optional moisture sensors 11a.

The remote fire/smoke sensors 11 may communicate with the master controller 12 or fire controllers 15 preferably using radio frequency (RF) communication signals 18, or may optionally use infrared communication signals 18, for example. Infrared communication signals 18 may be used if the remote fire/smoke sensors 11 are located at relatively short distances from the master controller 12, for example, and line-of-sight communication paths are present. The remote fire/smoke sensors 11 are operable at all times and each of them is separately identified and send a signal 18 to the master controller 12 when polled (generally at regular intervals) indicating that they are operative. This will be discussed in more detail below.

Figure 2:
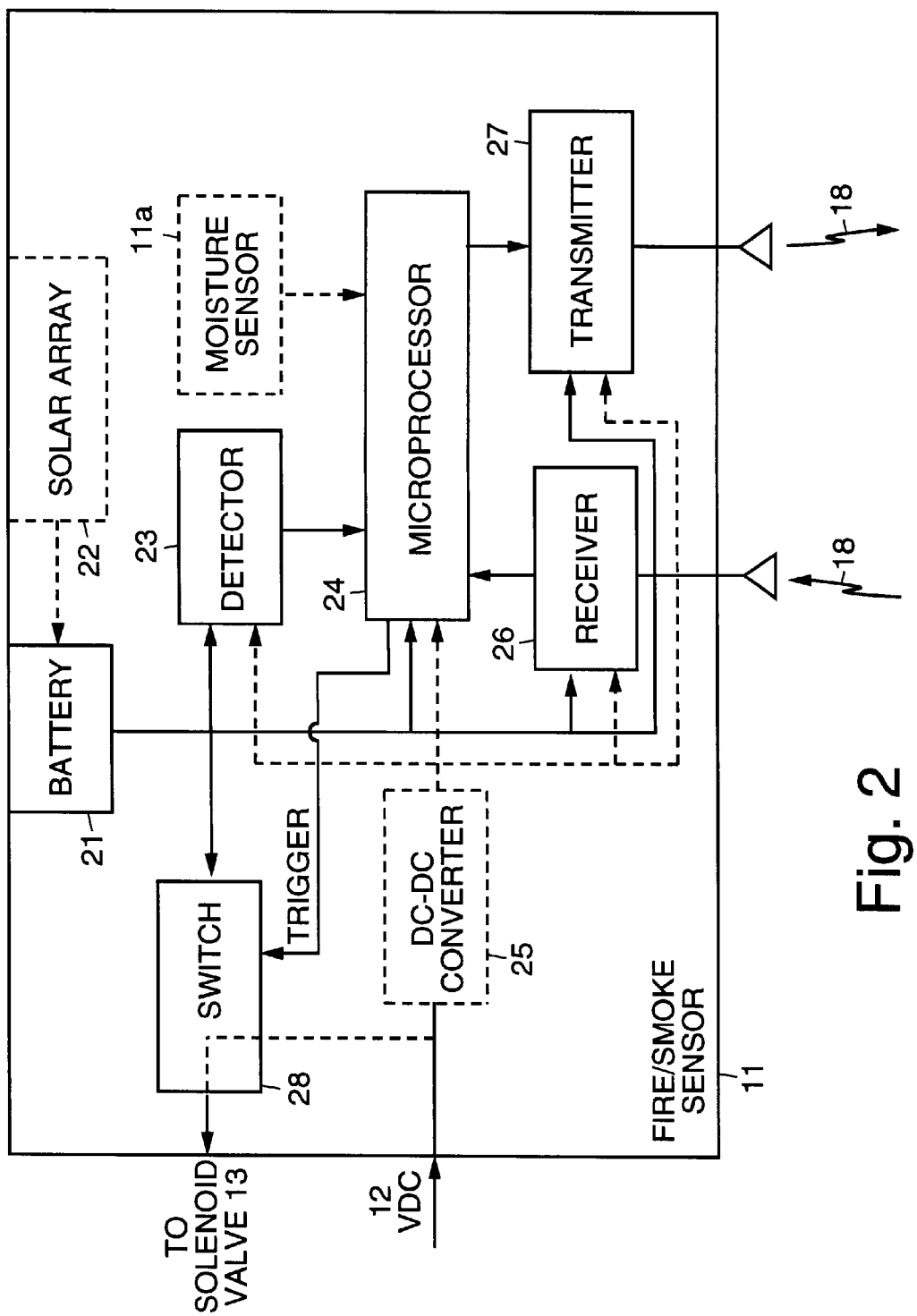
FIG. 2 is a block diagram that illustrates exemplary remote fire/smoke and moisture sensors that may be employed in the present invention.

FIG. 2 is a block diagram that illustrates an exemplary remote fire/smoke sensor 11 including the optional moisture sensor 11a that may be employed in the systems 10 shown in FIG. 1. The remote fire/smoke sensor 11 comprises a detector 23 that is coupled to the battery 21. The detector 23 detects fire and/or smoke and outputs an alarm signal.

The detector 23 is coupled to a microprocessor 24, which is also coupled to the battery 21. An optional moisture sensor 11a is also coupled to the microprocessor 24. The moisture sensor 11a outputs a signal that is input to the microprocessor 24 when the moisture level of the soil in which it is placed falls below a set level or limit.

The microprocessor 24 is coupled to a receiver 26 and to a transmitter 27. The receiver 26 and transmitter 27 are coupled to the battery 21. The receiver 26 and transmitter 27 are each coupled to an antenna.

The exemplary remote fire/smoke sensor 11 is preferably powered by the battery 21, but may be powered by a solar cell 22 and battery 21 combination. Alternatively, the remote fire/smoke sensor 11 may be hard wired to receive 12 volt DC power, such as from the master controller 11. However, this is a bit more complicated, because it would also require the addition of a DC-DC converter 25 for converting a 12 volt DC input, output by the master controller 12, for example, to a 5 volt DC output that powers the detector 23, microprocessor 24, receiver 26, and transmitter 27, and possibly the moisture sensor 11a if this is required.

Nonetheless, it is relatively inexpensive to implement a hardwired solution at the sprinkler head 14 instead of paying for batteries 21 and solar cells 22. This is because the DC-DC converter 25 is a three-terminal voltage regulator that costs on the order of $0.25. Furthermore, in the hard wired system 10, there is no requirement for solar or battery power at the sprinkler head 14 (except for power backup), there is a simple communication link and reliable channel. Burying wire during sprinkler system installation has minimal cost impact, and even in retrofit applications, it is very simple to lay wire with minimal intrusion.

The transmitter 27 is used to transmit the alarm signal to the master controller 11 or fire controllers 15, and to transmit signals indicating that it is operative. The receiver 26 is used to receive polling signals from the master controller 11 that cause the remote fire/smoke sensor 11 to transmit an output signal (data packet) indicating that it is operative. The "operative" output signal is transmitted to the master controller 11 when the remote fire/smoke sensor 11 is operative. The master controller 11 outputs a warning signal when the "operative" output signal is not received, thus indicating the presence an inoperative remote fire/smoke sensor 11.

Furthermore, the remote fire/smoke sensor 11 may be used to provide direct and autonomous control of a local solenoid valve 13. This is achieved using a switch 28 that is coupled to the microprocessor 24 and wired to switch 12 volt DC power to the solenoid valve 13. The microprocessor 24 outputs a trigger signal to the switch 28 in the event that an alarm signal or low water level signal occurs.

Exemplary radio transmitters 27 and receivers 26 for use in the system 10 are available from Micrel Semiconductor, for example. The devices manufactured by Micrel Semiconductor are known as QuikRadio™ transmitters and receivers and are single-chip RF integrated circuits that employ amplitude-shift-keyed/on-off keyed (ASK/OOK) modulation. These circuits are relatively low in cost and are easily integrated into the system 10.

Other RF transmitters 27 and receivers 26 are available from Ericsson and National Semiconductor which conform to the Bluetooth™ specification. The Bluetooth transmitters and receivers provide point-to-point and point-to-multipoint wireless RF connectivity between the transmitters and receivers.

Exemplary moisture sensors 11a that may be adapted for use in the systems 10 are available from Global Water Instrumentation, Inc., Gold River, Calif., Davis Instruments Corp., Hayward, Calif., and Environmental Sensors Inc., Victoria, British Columbia, for example.

FIG. 3 is a block diagram that illustrates an exemplary fire controller 15 that may be employed in the systems 10 shown in FIG. 1. The exemplary fire controller 15 may be powered by a battery 31, but may be powered by a solar cell 32 and battery 31 combination. The fire controller 15 may also be powered using 12 volt DC power. The use of the battery 31 provides added protection in the event that utility power is lost due to a major fire.

The fire controller 15 comprises a microprocessor 33 that is coupled to a receiver 35 and a transmitter 36. The microprocessor 33 is also coupled to a switch 37. The switch 37 is coupled to receive 12 volt DC power that is ultimately switched to the solenoid valve 13 coupled thereto. The battery is coupled to the microprocessor 33, the receiver 35, and the transmitter 36. The microprocessor 33 outputs a trigger signal to the switch 37 in the event that an alarm signal (or low water level signal) is received.

In the case where the fire controller 15 is powered using 12 volt DC power, the fire controller 15 comprises a DC-DC converter 34 (or voltage regulator 34) that is coupled to a 12 volt DC input derived from the master controller 12, for example. The DC-DC converter 34 converts the 12 volt DC input to a 5 volt DC output that powers the receiver 35 and transmitter 36 (such as a receiver and transmitter manufactured by Micrel Semiconductor, for example). The receiver 33 outputs a trigger signal that is applied to a switch 34 that switches the 12 volt DC input to the solenoid valve 13 when a signal is received from the remote fire/smoke sensor 11 or moisture sensor 11a.

FIG. 4 is a block diagram that illustrates an exemplary master controller 12 employed in the systems 10 shown in FIG. 1. The exemplary master controller 12 comprises a power supply 42 that is coupled to an AC voltage source. The power supply 42 is also coupled to a backup battery 41 and to a DC-DC converter 43. The DC-DC converter 43 converts 12 volts DC into 5 volts DC, for example. The DC-DC converter 43 is coupled to a transmitter 47 and to one or more receivers 48. The one or more receivers 48 are coupled to a master fire controller 44.

The power supply 42 is coupled to the master fire controller 44 and to a solenoid controller 45. The power supply 42 is also coupled to a plurality of switches 46 and supplies 12 volts DC thereto. The master fire controller 44 and solenoid controller 45 are each respectively coupled to the plurality of switches 46 and are used to switch the 12 volt DC signal to solenoid valves 13 coupled thereto. The switches 46 are respectively coupled to individual solenoid valves 13.

The solenoid controller 45 is conventional and controls operation of the landscape sprinkling systems 10 during normal conditions. The master fire controller 44 controls operation of the solenoid valves 13 in the event of fire and optionally in the event of low moisture detected by the optional moisture sensor 11a.

The master fire controller 44 is contains substantially the same components that are employed in the fire controller 15, except for the battery 31, solar array 32 and DC-Dc converter 34 shown and described with reference to FIG. 3. The master fire controller 44 also comprises a plurality of switches 37 corresponding to the number of solenoid valves 13 in the system 10 that are controlled thereby.

The master controller 12 polls each of the remote fire/smoke sensors 11 on a regular basis to determine if they are operative. FIG. 5 is a table that illustrates an exemplary serial communication protocol that may be used in the present systems 10.

As is illustrated in FIG. 5, an exemplary data packet includes three (3) synchronization bytes, two (2) address bytes identifying a "To" address, two (2) address bytes identifying a "From" address, two (2) bytes indicating a data type, two (2) bytes indicating a data length, a plurality of data bytes, a verification checksum, and an end of message marker. By way of example, and as is shown in FIG. 5, an exemplary data packet may be as follows {@@@, A3, 01, 02, 06, A, 2, . . . , F, 3D, ###}. As for the data type, a "0" may be used to identify a "heartbeat", i.e., that the sensor 11 is operational, a "1" may be used to identify a report request, a "2" may be used to identify a report response, and a "3" may be used to identify an unsolicited transmission, i.e., the alarm. It is to be understood that the number and use of the data identifiers may vary, and is at the discretion of the designer of the system 10.

The synchronization bytes are characters indicating the start of a packet. The "To" address comprises 16 bits and provides more than 65,000 remote device addresses. The "From" address comprises 16 bits and provides more than 65,000 remote device addresses. The data type comprises 16 bits and provides different definitions of the data that follows, including encryption, for example. The data length indicates how many bytes follow within the current packet. The data comprise individual bytes of data within the packet. The verification checksum comprises a number of bytes that indicates that the data packet arrived completely and correctly. The end of message marker comprises marker bytes that indicate the end of the current packet.

Each remote fire/smoke sensor 11 has a unique identification (ID) number assigned to it, which is a predetermined number of bits of a data packet that is transmitted back to the master controller 12. The data packet transmitted by the master controller 12 includes the identification (ID) number bits, one or more bits indicating that the sensor 11 is "operative", and a checksum bit.

During polling, the master controller 12 transmits a data packet containing the ID number of a selected remote fire/smoke sensor 11. All remote fire/smoke sensors 11 receive and process the transmitted data packet. The processing of the data packet is performed in the microprocessor 24. The selected remote fire/smoke sensor 11 having the ID number contained in the data packet responds to the received data packet by transmitting a data packet containing the "operative" output signal. The microprocessor 33 in the master controller 12 processes the received data packet containing the "operative" output signal to verify that the selected remote fire/smoke sensor 11 is operative.

When an event occurs, such as detection of fire or smoke or a low moisture condition, the affected remote fire/smoke sensor 11 transmits a data packet to the master controller 12 that contains its identification (ID) number, a predetermined number of bits corresponding to an alarm output signal, and a checksum bit. The master controller 12 activates the appropriate solenoid valve 13 to sprinkle water onto the affected area of the landscape.

Alternatively, the affected remote fire/smoke sensor 11 transmits the data packet to the corresponding fire controller 15 that controls the solenoid valve 13 for the affected area of the landscape. The fire controller 15 activates the associated solenoid valve 13 to sprinkle water onto the affected area of the landscape.

Thus, remote sensing is provided by the remote fire/smoke sensors 11 (and remote moisture sensors 11a) and output signals from affected ones of the sensors 11, 11a are wirelessly communicated to the master controller 12 or fire controller 15 for processing and control of appropriate sprinkler heads 14 of affected irrigation areas or zones.

In a wireless system embodiment, it is preferred that the remote fire/smoke sensors 11 are asleep most of the time, waking once per minute, for example, to test for smoke, heat or moisture. The remote fire/smoke sensors 11 would then autonomously transmit if an event has occurred, or if it is time for their regular heartbeat transmission. In general, one would not poll the remote devices since they are typically asleep. In a wired system embodiment, just the opposite is preferred, since unlimited power is available at the remote device. In this case, the communication wires would also carry the power, and polling is appropriate.

Each of the remote fire/smoke sensors 11 are polled by the master fire controller 44, generally at regular intervals. When polled, each of the remote fire/smoke sensors 11 respectively output a data packet indicative that it is operational. The data packet is transmitted to the master fire controller 44 by way of its one of more receivers 48, or to the fire controllers 15 by way of their receiver 35. An alarm signal is output by he master fire controller 44 in the event that one of the remote fire/smoke sensors 11 is not operational.

Thus, the master controller 12 or fire controllers 15 thus process alarm signals transmitted by the remote fire/smoke sensors 11 in the event that fire and/or smoke is detected, or process output signals from the optional moisture sensors indicating low moisture content. Once an alarm signal is received by the master controller 12 or fire controllers 15, it is processed to turn on one or more solenoid valves 13 that allow water to be sprinkled onto the affected area.

Thus, landscape sprinkling systems that include remote fire and moisture sensing features have been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A landscape sprinkling system comprising:
   one or more sprinkler solenoid valves that are each coupled between a water supply and one or more sprinkler heads disposed in a landscape;
   a controller comprising one or more fire controllers that are respectively coupled to the one or more sprinkler solenoid valves; and
   one or more remote sensors that communicate with the controller and transmit an alarm signal to the controller in the event that fire and/or smoke are detected thereby;
   and wherein the controller is configured to process the alarm signal and activate selected solenoid valves to allow water to be sprinkled onto selected areas of the landscape from the one or more sprinkler heads disposed in the landscape.

2. The landscape sprinkling system recited in claim 1 that further comprises a moisture sensor coupled to the controller for indicating low soil moisture content.

3. The landscape sprinkling system recited in claim 1 wherein the remote sensors communicate with the controller using radio frequency (RF) communication signals.

4. The landscape sprinkling system recited in claim 1 wherein the remote sensors communicate with the controller using infrared communication signals.

5. The landscape sprinkling system recited in claim 1 wherein the remote sensors communicate with the controller using a wired communication link.

6. The landscape sprinkling system recited in claim 1 wherein the remote sensors each comprise:
   a detector for detecting the presence of fire and/or smoke and outputting an alarm signal when fire and/or smoke are detected;
   a transmitter;
   a receiver; and
   a microprocessor coupled to the transmitter, the receiver and the detector for processing the alarm signal and transmitting it to the controller.

7. The landscape sprinkling system recited in claim 6 wherein the remote sensors each further comprise a battery coupled to the microprocessor, transmitter, receiver and detector.

8. The landscape sprinkling system recited in claim 6 wherein the remote sensors each further comprise a solar array coupled to the battery.

9. The landscape sprinkling system recited in claim 6 wherein the remote sensors each further comprise a DC-DC converter coupled between a voltage source and the microprocessor, transmitter, receiver and detector.

10. The landscape sprinkling system recited in claim 1 wherein the controller is configured to poll each of the remote sensors to determine if they are operative.

11. The landscape sprinkling system recited in claim 1 wherein the one or more fire controllers comprise:
    a transmitter;
    a receiver;
    a switch coupled to an associated solenoid valve; and
    a microprocessor coupled to the transmitter, the receiver, and the switch, for processing a received alarm signal and triggering the switch to activate the associated solenoid valve coupled thereto.

12. The landscape sprinkling system recited in claim 11 wherein the one or more fire controllers each further comprise a battery coupled to the microprocessor, transmitter and receiver.

13. The landscape sprinkling system recited in claim 11 wherein the one or more fire controllers each further comprise a solar array coupled to the battery.

14. The landscape sprinkling system recited in claim 11 wherein the one or more fire controllers each further comprise a DC-DC converter coupled between a voltage source and the microprocessor, transmitter and receiver.

15. A landscape sprinkling system comprising:
    one or more sprinkler solenoid valves that are each coupled between a water supply and one or more sprinkler heads disposed in a landscape; and
    one or more remote sensors coupled to the one or more sprinkler solenoid valves that
    each comprise a detector for detecting the presence of fire and/or smoke and outputting an alarm signal when fire and/or smoke is detected, a switch coupled to an associated solenoid valve, and a microprocessor coupled to the detector and the switch for processing the alarm signal and transmitting a trigger signal to the switch to activate the associated solenoid valve coupled thereto, that generate an alarm signal in the event that fire and/or smoke are detected thereby, and to process the alarm signal and activate selected solenoid valves to allow water to be sprinkled onto selected areas of the landscape from the one or more sprinkler heads disposed in the landscape.

16. The landscape sprinkling system recited in claim 15 wherein the one or more remote sensors each further comprise a transmitter, a receiver and a battery coupled to the microprocessor, transmitter and receiver.

17. The landscape sprinkling system recited in claim 16 wherein the one or more remote sensors each further comprise a solar array coupled to the battery.

* * * * *